United States Patent
Reel et al.

[19]

[11] Patent Number: 5,852,653
[45] Date of Patent: Dec. 22, 1998

[54] COMMUNICATIONS LINE SECURITY DEVICE

[76] Inventors: John Steven Reel, Rt. 2 Box 53M, Marion, Tex. 78124; William Lawrence Clayton, 2710 Pebble Breeze, San Antonio, Tex. 78232; Larry Earl Horton, 25103 Arrow Ridge, San Antonio, Tex. 78258; Louis Bernard Knecht, 1330 Adobe Run, San Antonio, Tex. 78232; Thomas John Pavlik, 32040 Rock Forest, Fair Oaks Ranch, Tex. 78015; Steven Kent Wooster, 1955 Creek Hollow, San Antonio, Tex. 78259

[21] Appl. No.: 701,248

[22] Filed: Aug. 23, 1996

[51] Int. Cl.⁶ .............................. H04M 1/66; H04M 1/57
[52] U.S. Cl. .................... 379/88; 379/93.02; 379/93.03; 379/93.04; 379/188; 379/199; 379/142
[58] Field of Search ............................ 379/67, 88, 93.01, 379/93.02, 93.03, 93.04, 93.09, 108, 199, 142; 380/25; 340/825.34

[56] References Cited

U.S. PATENT DOCUMENTS

| | | | |
|---|---|---|---|
| 3,614,329 | 10/1971 | Topfer et al. | 179/188 E |
| 4,266,098 | 5/1981 | Novak | 179/5.5 |
| 4,277,649 | 7/1981 | Sheinbein | 179/18 B |
| 4,430,728 | 2/1984 | Beitel et al. | 364/900 |
| 4,443,664 | 4/1984 | Gange | 179/5.5 |
| 4,531,023 | 7/1985 | Levine et al. | 379/93.02 |
| 4,626,623 | 12/1986 | LaHaye | 379/95 |
| 4,817,133 | 3/1989 | Takahashi et al. | 379/199 |
| 4,845,743 | 7/1989 | Lutz | 379/199 |
| 4,876,717 | 10/1989 | Barron et al. | 380/25 |
| 5,109,405 | 4/1992 | Morganstein | 379/89 |
| 5,127,049 | 6/1992 | Sabo | 379/199 |
| 5,142,565 | 8/1992 | Ruddle | 379/93.03 |
| 5,351,289 | 9/1994 | Logsdon et al. | 379/142 |
| 5,365,580 | 11/1994 | Morisaki | 379/189 |
| 5,377,260 | 12/1994 | Long | 379/142 |
| 5,440,618 | 8/1995 | Riegel et al. | 379/93.04 |
| 5,465,290 | 11/1995 | Hampton et al. | 379/67 |
| 5,546,448 | 8/1996 | Caswell et al. | 379/142 |
| 5,636,282 | 6/1997 | Holmquist et al. | 379/93.03 |
| 5,644,629 | 7/1997 | Chow | 379/142 |

Primary Examiner—Daniel S. Hunter
Attorney, Agent, or Firm—Locke Purnell Rain Harrell

[57] ABSTRACT

A device and method for securing terminal equipment connected to a communications line is disclosed. The device, when inserted into the communications line between the caller and terminal equipment, places an air gap in the communications line physically preventing unauthorized callers from accessing the equipment. The device employs an authentication line separate from the communications path that is used to authenticate the caller wishing to use the terminal equipment. The caller must first call the authentication line where the information regarding the source of the caller is retrieved and stored. Once the caller's source is identified, the device answers the line and requires that the caller enter an authentication code. If a proper authentication code is entered, the device disconnects the authentication line and waits a predetermined amount of time for a call on the communications line. When a call is received during the predetermined period on the communications line, the source information of the caller is retrieved and compared to the information stored from the authentication call. If the information matches, the air gap is closed allowing the caller to access the terminal equipment. A line activity detector monitors the communications line and causes the air gap to be reopened when the caller disconnects from the terminal equipment.

25 Claims, 4 Drawing Sheets

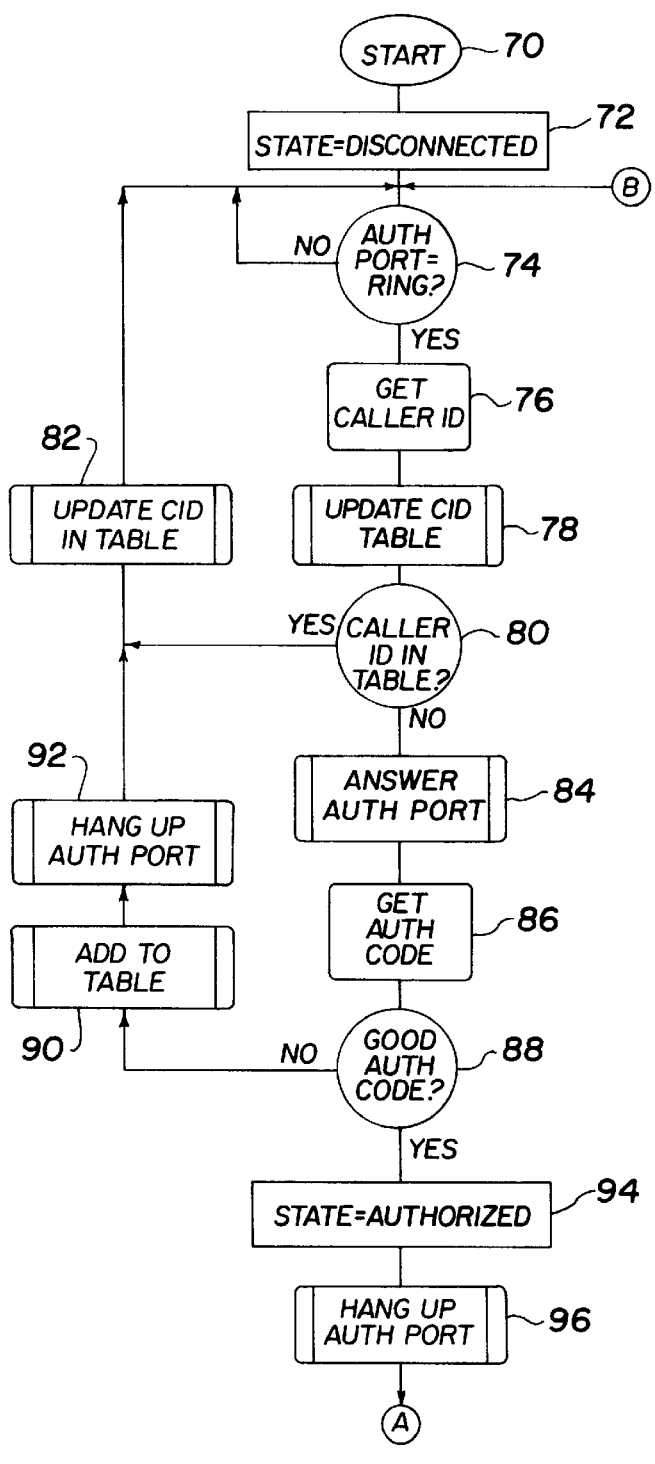
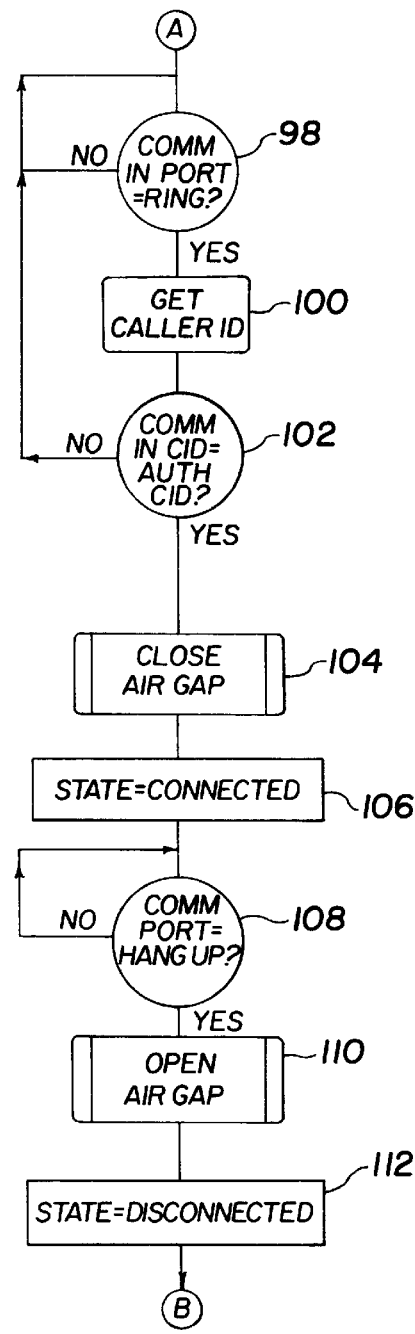
Fig. 3A
Fig. 3B

COMMUNICATIONS LINE SECURITY DEVICE

FIELD OF THE INVENTION

The present invention relates to a method and apparatus for securing a communications line. Specifically, the device protects terminal equipment such as computers, facsimile machines and the like, from intrusion or unauthorized use.

BACKGROUND OF THE INVENTION

It is often desirable or necessary to access certain equipment, or terminal equipment, via a communications line such as a telephone line, computer network connection, radio link, fiber optics, or any other electrical line carrying information signals. This terminal equipment includes computers, facsimile machines and the like. It can be equally desirable or necessary to protect this equipment from access by unauthorized or undesired users. Protection against unauthorized users has taken several forms which include requiring users to login to the terminal equipment using login routines and passwords, and encrypting the communications between the caller and the terminal equipment.

Login routines are implemented at and by the terminal equipment itself and usually have the connection controlled by software in the terminal equipment. This means that the caller is immediately physically connected to the terminal equipment but is prevented from accessing the resources of the terminal equipment by software routines. This has obvious disadvantages. As soon as the caller is physically connected to the terminal equipment, the caller has the opportunity to defeat the software acting as the protection against unauthorized access.

Encryption techniques require that both the caller and the terminal equipment use the same encryption devices and employ the same encryption methods. Encryption devices are usually expensive and drastically slow the communication rates between the caller and the terminal equipment.

What is needed is a device that provides a physical disconnection from the terminal equipment, is separated from the terminal equipment and is transparent to the caller once the communications path has been established.

SUMMARY OF THE INVENTION

A communications line security device is provided that allows terminal equipment to be protected from unauthorized callers. The communications line security device is inserted into the communications path and is separate from the terminal equipment. The device provides an air gap, or physical disconnection, in the communications line between the caller and the terminal equipment that can only be closed when the caller follows the proper authentication procedures and enters a valid authentication code.

The communications line security device utilizes separate paths, such as telephone lines or network connections, for authentication of the caller and communication between the caller and the terminal equipment. The communications line is used to connect the caller with the terminal equipment. The communications line security device places a switch in the communications line that provides a physical disconnection between the caller and the terminal equipment when open. The switch is a normally open relay in the preferred embodiment and is controlled by a microcontroller, which with additional elements of the communication line security device acts as a controller for the entire device. In order for the caller to connect to the terminal equipment he must first call the authentication port and provide a valid authentication code. Information concerning the source of the call is stored by the controller when the authentication port is called. This information can be CallerID® information which is provided by the phone company, or can be any source identification information which is inherent to the communications system being employed. When the CallerID®, or equivalent information, is stored the line is answered and the caller can be prompted to enter an authentication code. If an invalid authentication code is entered, the CallerID® information is added to a table of banned callers which will be used to ban that caller from accessing the terminal equipment for a specified amount of time.

If the authentication code is valid, the communications line security device waits a predetermined amount of time for a call on the communications line. If a call is detected on the communications line within the predetermined amount of time, the communications line security device retrieves the CallerID® information of the caller and verifies this information against the CallerID® information retrieved and stored from the authentication line as a result of the authentication call. Additionally, the code comparator, which is separate, but electrically connected to the microcontroller, is used to determine the validity of the authentication code entered by the caller. A valid comparison of the caller's authentication code, which is stored in the microcontroller, and the code stored in the authentication code switch bank is output to a two input AND gate. The AND gate uses these inputs to determine when, and if, to close the air gap. If these conditions are met, the air gap, which can be a relay switch, is closed by the controller thereby connecting the caller to the terminal equipment using the communications line. Once connected, a line activity detector monitors the line and signals the controller when the caller disconnects from the terminal equipment so that the controller can reopen the relay.

LEDs are provided on the communications line security device to show the current state of the device. Additionally, a bypass switch and an outgoing enable/disable control are provided. The bypass switch allows the communications line security device to be bypassed and the outgoing enable/disable control determines whether outgoing calls can be placed by the terminal equipment. In order to prevent tampering with the valid authentication code set by the communications line security device, the authentication code is physically set by an authentication code switch bank that is set and changed physically at the communications line security device itself.

BRIEF DESCRIPTION OF THE DRAWINGS

Other objects and features of the invention will become more readily apparent from the following detailed description when read in conjunction with the accompanying drawings, wherein:

FIGS. 3A and 3B are a flow chart showing the operational flow of the preferred embodiment of the present invention;

DETAILED DESCRIPTION

Figure 1:
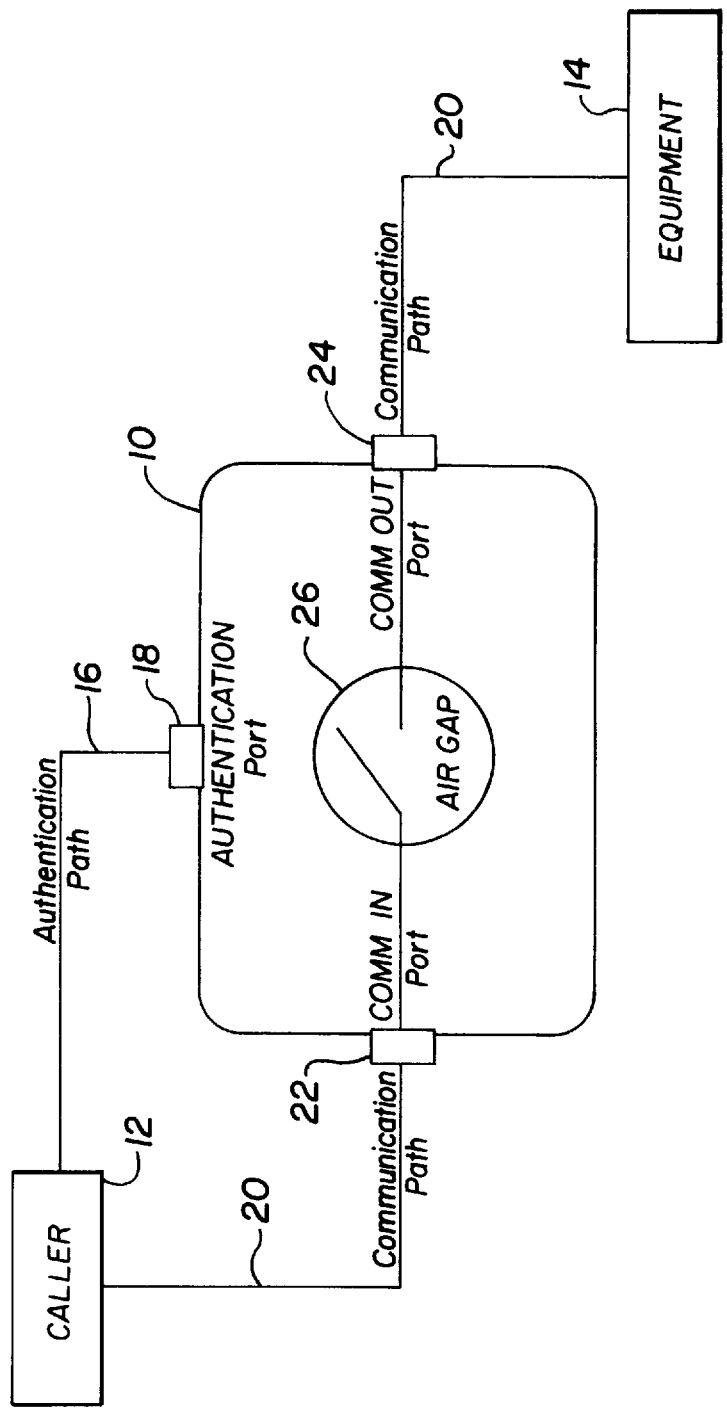
FIG. 1 is a simplified block diagram showing the external operation of the present invention.

FIG. 1 is a simplified diagram showing the external operation of the present invention. Communications line security device 10 prevents caller 12 from connecting to terminal equipment 14 unless proper authentication procedures are followed. In order for caller 12 to access terminal equipment 14, caller 12 must use authentication path 16 to connect to authentication port 18 of communications line security device 10. When a request for authentication is received from caller 12 at authentication port 18, communications line security device 10 checks and stores the source information, such as the CallerID® information, of caller 12 and requests caller 12 to input the authentication code associated with communications line security device 10. If a proper authentication code is entered, caller 12 has a predetermined amount of time to disconnect from authentication port 18 and connect to COMM IN port 22 via communications path 20. If caller 12 calls COMM IN port 22 within the predetermined amount of time, communications line security device 10 retrieves the source information of caller 12. Communications line security device 10 then checks the source information of caller 12 and compares that information to the source information stored from authentication port 18. If, and only if, both the source information received at COMM IN port 22 matches the stored source information and a proper authentication code was entered, communications line security device 10 closes air gap 26 separating COMM IN port 22 and COMM OUT port 24, thereby completing communications path 20. When air gap 26 is closed, caller 12 is able to freely access terminal equipment 14. Air gap 26 is reopened and communications line security device 10 is reset as soon as caller 12 disconnects from terminal equipment 14.

Figure 2:
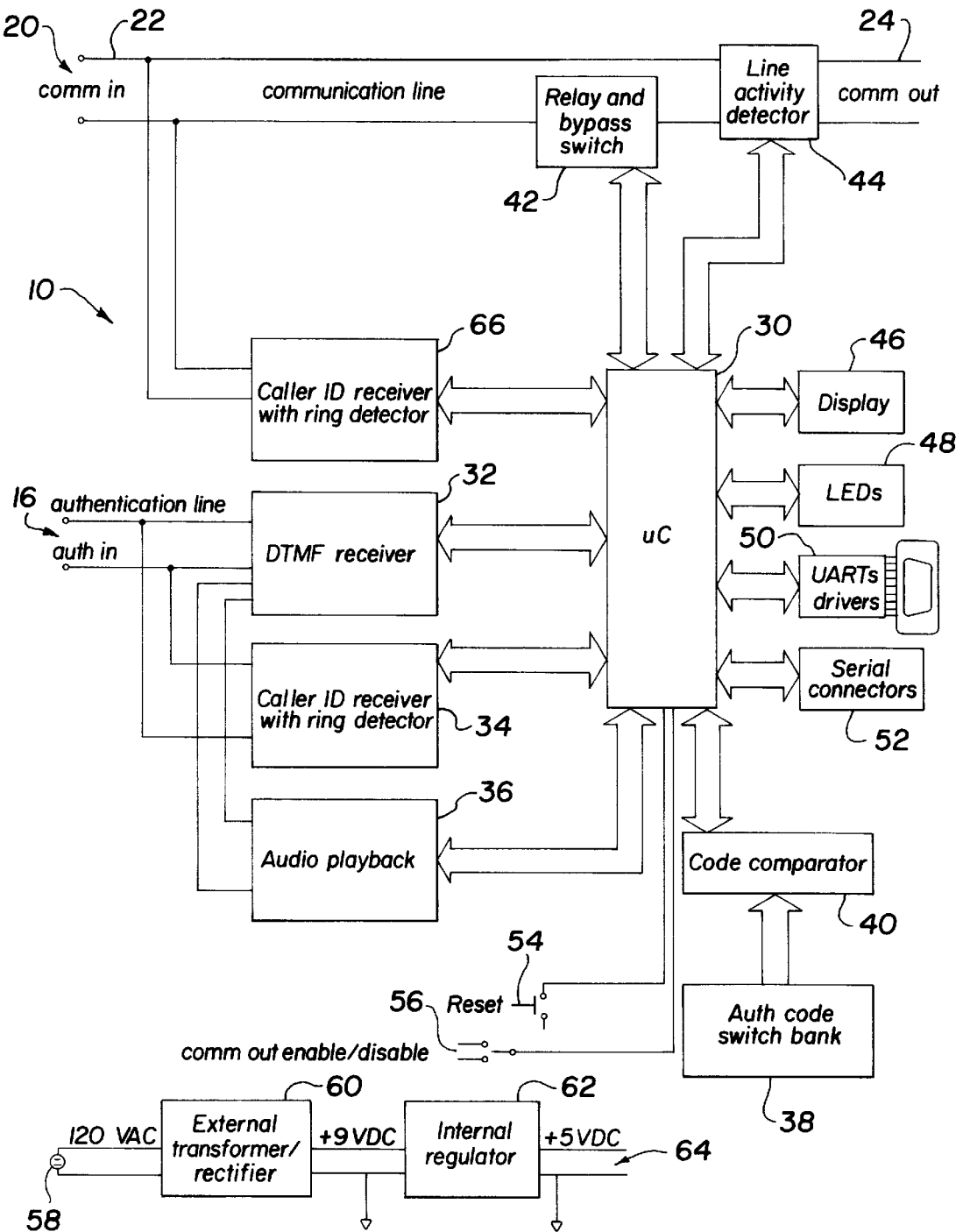
FIG. 2 is a block diagram of the electrical circuit implementing the preferred embodiment of the present invention.

Referring now to FIG. 2, a block diagram of the electronics implementing the preferred embodiment of the present invention is shown. Authentication line 16 from FIG. 1 is electrically connected to both DTMF receiver 32 and CallerID® receiver 34. DTMF receiver 32 is also electrically connected to audio playback unit 36. DTMF receiver 32, CallerID® receiver 34, and audio playback unit 36 are all connected to and controlled by microcontroller 30. Communications line 20 is electrically connected to CallerID® receiver 66 and also to the terminal equipment (not shown) through relay and bypass switch 42 and line activity detector 44, all of which are connected to and controlled by microcontroller 30. Code comparator 40 is electrically connected between authentication code switch bank 38 and microcontroller 30. Code comparator 40 receives the system authentication code set by authentication code switch bank 38 and the authentication code inputted by the caller from microcontroller 30. It then compares the two authentication codes and outputs the result to AND gate 68. Microcontroller 30 is also electrically connected to and controls the user interfaces which include display 46, LEDs 48, UART/drivers 50, and serial connector 52.

Communications line security device 10 is powered by external source 58. External source 58 is converted from AC to DC by external transformer 60. The DC power from external transformer 60 is then regulated by internal regulator 62 which provides system voltage 64 used to power the electronics of communications line security device 10.

As stated, authentication line 16, as shown in FIG. 1, is connected to DTMF receiver 32 and CallerID® receiver 34. In operation, CallerID® receiver 34 detects a call on authentication line 16 and decodes the CallerID® information. This information is passed to microcontroller 30 which stores the CallerID® information and checks the information against a table of numbers that are not permitted to access the terminal equipment. If the number is in the table of banned numbers the line is allowed to ring and is not answered. If the number is not in the table of banned numbers the call is answered by DTMF receiver 32. A message can be played using audio playback unit 36 to prompt the caller to enter the authentication code using a touch tone telephone or modem with touch tone capabilities. The DTMF receiver 32 decodes the touch tone authentication code provided by the caller and sends it to microcontroller 30. Microcontroller 30 then sends the authentication code received from the caller to code comparator 40 where the caller's authentication code is compared to the system authentication code physically set at authentication code switch bank 38. Authentication code switch bank 38 allows the system administrator to change the system authentication code as necessary by physically manipulating authentication code switch bank 38. Also, by using the switch bank located on communications line security device 10, the system authentication code is hard-wired into the device as opposed to being stored electronically where it could potentially be tampered with remotely. Authentication code switch bank 38 ensures that the system authentication code can only be changed by physically altering the characteristics at the switch bank.

Returning to code comparator 40, if the authentication code entered by the caller matches the system authentication code, code comparator 40 causes one input of AND gate 68 to go high. Microcontroller 30 then waits a predetermined amount of time for the caller to call communications line 20. When the call is detected on communications line 20 within the predetermined amount of time, communications line CallerID® receiver 66 decodes the CallerID® information and passes it to microcontroller 30 which compares it to the CallerID® information received from CallerID® receiver 34. If the CallerID® information matches, microcontroller 30 causes the second input of AND gate 68 to go high which causes AND gate 68 to close normally open relay and bypass switch 42, thereby connecting COMM IN port 22 and COMM OUT port 24, completing communications path 20 and allowing the caller to access the terminal equipment. Line activity detector 44 monitors communications path 20 and signals microcontroller 30 when the caller is finished and has disconnected from the terminal equipment. Microcontroller 30 then reopens relay and bypass switch 42, which places an air gap in communications path 20 between COMM IN port 22 and COMM OUT port 24.

Display 46 is used to display CallerID® information supplied by microcontroller 30 to the system administrator. LEDs 48 are used to show the current state of communications line security device 10. In the preferred embodiment, six LEDs are used to provide the system administrator with information on the current state of communications line security device 10. The specific LEDs used in the preferred embodiment will be discussed with reference to FIG. 4 below. UART/drivers 50 allows communications line security device 10 and specifically microcontroller 30 to be accessed using a personal computer. UART/drivers 50 is used to update the programming for communications line security device 10 stored in microcontroller 30 and to access other information such as the table of callers banned from accessing the terminal equipment. Serial connector 52 allows communications line security device 10 to be connected to other communications line security devices. Reset switch 54 when closed resets microcontroller 30 and communications line security device 10 to a known initial state. COMM OUT enable/disable 56 sets microcontroller 30 to either enable outgoing calls from the terminal equipment, or disable outgoing calls from the terminal equipment.

Referring now to FIGS. 3A and 3B, the basic operational flow of communications line security device 10 from FIG. 2 is described. Block 70 represents placing communications line security device 10 into an initial known state such as by pressing reset switch 54 from FIG. 2. This initial state, represented by block 72 is "disconnected" with relay and bypass switch 42 open, providing an air gap in communications path 20. In the "disconnected" state the authentication line is monitored for an incoming call, as shown by block 74. When a call is detected by CallerID® receiver 34 from FIG. 2, the CallerID® information is retrieved, as shown by block 76. Block 78 represents the updating of the table storing callers prevented from accessing the terminal equipment. This update is done before the CallerID® information just retrieved is processed and involves purging the table of callers whose ban on accessing the terminal equipment has expired. This is necessary because every caller who provides an invalid authentication code is banned from access for an increasing period of time corresponding to the number of invalid authentication codes entered by a particular caller. Therefore, the more invalid authentication codes entered by a particular caller the longer the duration of the current ban. This allows someone who accidentally entered an invalid authentication code to retry authentication relatively quickly, while someone who is attempting to randomly guess the code will be prevented from accessing for a substantial period of time after just a few invalid attempts.

When the table of callers prevented from accessing the system is updated, the system checks to see if the CallerID® information just retrieved is in the table, as represented by block 80. If the caller is in the table the system proceeds to block 82 where the duration of the ban for this caller is updated and the line is simply allowed to ring until the caller hangs up. The process then returns to block 74 and awaits the next call. However, if the CallerID® information is not in the table, the line is answered, shown by block 84. When the call is answered, a message can be played to the caller by audio playback unit 36 from FIG. 2 requesting an authentication code or simply disguising the communications line security device as an answering system. After the line is answered the system waits for the authentication code to be entered as represented by block 86. When the authentication code has been entered, the system then proceeds to check the authentication code, shown by block 88, to see if it is valid. To determine if an authentication code is valid, code comparator 40 from FIG. 2, which is separate, but electrically connected to microcontroller 30, again from FIG. 2, is used. A valid comparison of the caller's authentication code, which is stored in microcontroller 30, and the code stored in authentication code switch bank 38, from FIG. 2, is output to AND gate 68, which is also shown in FIG. 2. AND gate 68 uses these inputs to determine when, and if, to close the air gap. If three invalid codes are entered, the CallerID® information is added to the table of banned callers, shown by block 90, the authentication port is hung up, shown by block 92, and the caller information just added is updated to include the ban duration which is based on the circumstances surrounding the call, represented again by block 82.

If, however, the authentication code entered by the caller is valid, the system's state is changed from "disconnected" to "authorized," as shown by block 94. Block 96 represents the authentication port being hung up so that the communications port can be monitored for an incoming call, as shown in block 98. When a call is detected on the communications line, the CallerID® information is retrieved by communications line CallerID® receiver 66 from FIG. 2, represented by block 100, and compared against the authentication line CallerID® information just received which is shown by block 102. If the new CallerID® information does not match the authentication line CallerID® information, the line is allowed to ring until hung up and the system again monitors the line for incoming calls, again represented by block 98. The air gap can close only with the following two occurrences. First, a valid comparison of the caller's authentication code to the authentication code set in the authentication code switch bank 38 shown in FIG. 2 must occur. Second the communications line CallerID® information must match the authentication line CallerID® information. These two positive matches are then logically ANDed through a hardware component to close the air gap. If these conditions are met, the air gap is closed by closing normally open relay and bypass switch 42 from FIG. 2, represented by block 104, and the state of the system is changed to "connected," shown in block 106. Block 108 represents the communications line being monitored for activity by line activity detector 44 from FIG. 2. When the communications line is hung up, the air gap is reopened, represented by block 110, and the system is reset to a state of "disconnected," shown by block 112. The system then returns to block 74, which represents the authentication line being monitored for incoming calls.

Figure 4:
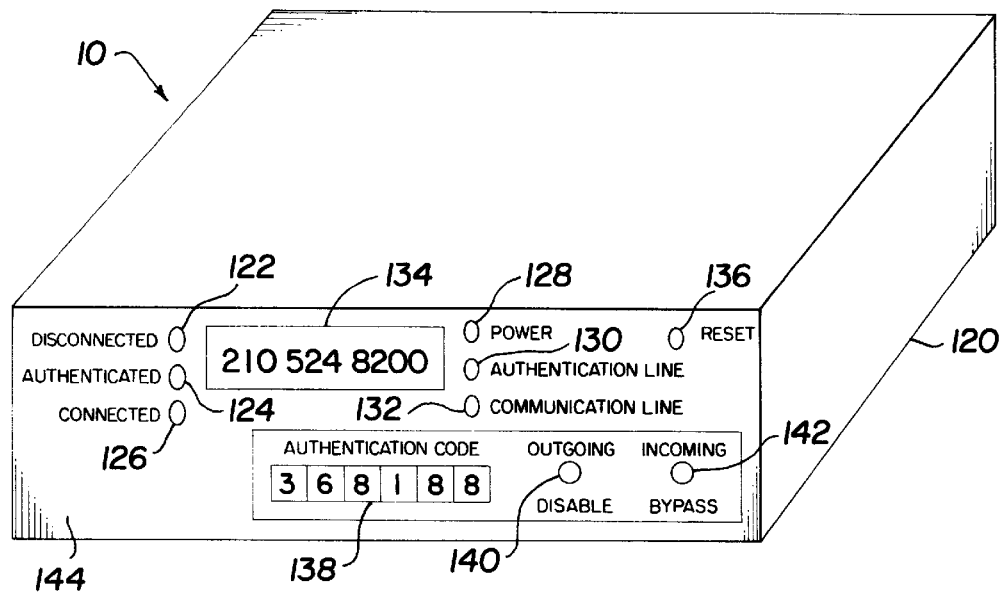
FIG. 4 is a perspective view of the housing showing the front panel of the preferred embodiment of the present invention.

Referring now to FIG. 4, a perspective view showing from panel 144 of communications line security device 10 is described. Communications line security device 10 is contained within housing 120. Housing 120 includes front panel 144 which provides the system administrator with access to various system controls. The specific LEDs 48 from FIG. 2 used in the preferred embodiment include status indicators "disconnected" LED 122, "authorized" or "authenticated" LED 124, and "connected" LED 126. These indicators correspond to the various states described in the operational flow diagram of FIGS. 3A and 3B and are lit when the device is in that particular state. The preferred embodiment also includes power LED 128 which indicates whether communications line security device 10 is connected to a power source, and authentication line LED 130 and communications line LED 132 which are lit whenever there is activity on the authentication line or communications line, respectively. Front panel 144 also contains display 134, corresponding to display 46 from FIG. 2. Display 134 displays CallerID® information for the system. Reset button 136 controls reset switch 54 from FIG. 2 and can reset communications line security device 10 to a known initial state. Authentication code switches 138 show the current authentication code to which authentication code switch bank 38 from FIG. 2 is set. Outgoing enable/disable selector 140 controls COMM OUT enable/disable 56 from FIG. 2 and determines whether outgoing calls are permitted from the terminal equipment. Incoming bypass selector 142 is connected to relay and bypass switch 42 from FIG. 2 and allows manual bypassing of the normally open relay, effectively overriding communications line security device 10.

Figure 5:
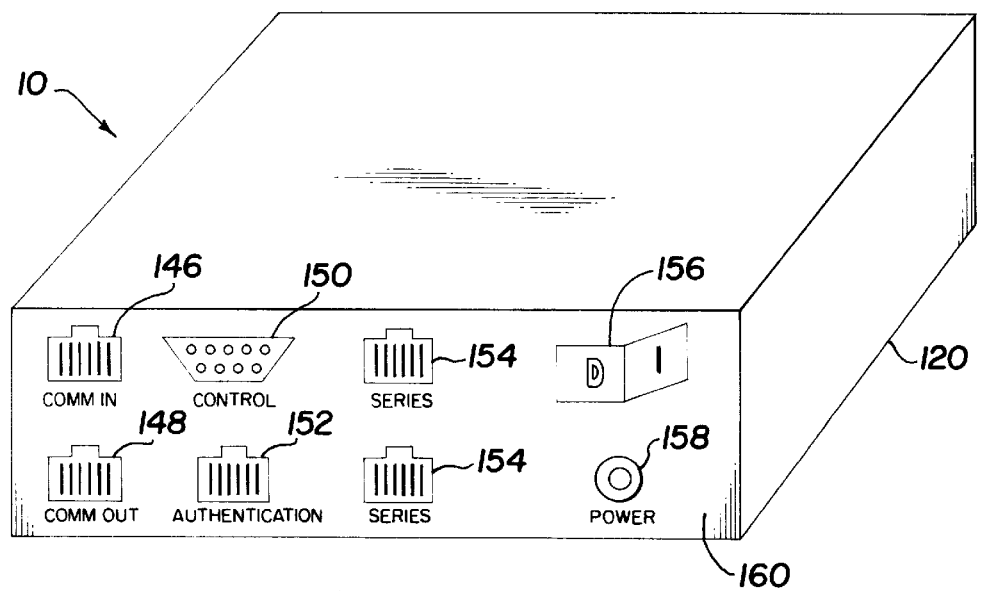
FIG. 5 is a perspective view of the housing showing the back panel of the preferred embodiment of the present invention.

Referring now to FIG. 5, a perspective view of communications line security device 10 showing rear panel 160 is described. Housing 120 of communications line security device 10 also includes rear panel 160 which provides access to various connectors and to power switch 156. Rear panel 160 includes COMM IN connector 146 and COMM OUT connector 148 corresponding to COMM IN port 22 and COMM OUT port 24, respectively, from FIGS. 1 and 2.

COMM IN connector 146 and COMM OUT connector 148 allow communications line 20 to be routed through communications line security device 10 using standard telephone jacks. Similarly, authentication line connector 152 connects authentication path 16 from FIG. 1 to authentication port 18. UART/drivers connector 150 allows a personal computer to be connected to UART/drivers 50 from FIG. 2. Series connectors 154 allow other communications line security devices to be connected to communications line security device 10 through serial connector 52 from FIG. 2 again using standard telephone jacks. Power switch 156 connects and disconnects communications line security device 10 from power supplied through power connector 158.

In the preferred embodiment of the present invention, the microcontroller shown by microcontroller 30 in FIG. 2 is preferably a general purpose, multi-function controller, such as the 68HC1E9 microcontroller available from Motorola, Inc., Schaumburg Illinois. Although a microcontroller is used in the preferred embodiment, it can be clearly seen that the same functions can be obtained using readily available discrete components.

While the invention has been particularly shown and described with reference to a preferred embodiment, it will be understood by those skilled in the art that various changes in form and detail may be made therein without departing from the spirit and scope of the invention.

What is claimed is:

1. A communications line security device for connecting a caller to a piece of terminal equipment, the communications line security device comprising:
   a) a communications path including a COMM IN port and a COMM OUT port, the communications path used to connect the caller to the piece of terminal equipment;
   b) a switch electrically connected between the COMM IN port and the COMM OUT port providing a physical disconnection between the caller and the piece of terminal equipment when open;
   c) an authentication port separate from the communications path; and
   d) a controller electrically connected to the authentication port and the switch which acts to verify information provided on the authentication port matches information on the communications path to the information on the authentication path, and closes the switch when the caller is verified resulting in the caller being physically connected to the piece of terminal equipment.

2. The communications line security device of claim 1 wherein the communications line is a telephone line.

3. The communications line security device of claim 2 wherein the information provided on the authentication port and communications path is CallerID® information.

4. The communications line security device of claim 3 wherein the authentication port comprises a DTMF receiver which receives and decodes touch tone information and a CallerID® receiver which receives the CallerID® information.

5. The communications line security device of claim 4 wherein the authentication port further comprises an audio playback unit which provides audio messages to the caller.

6. The communications line security device of claim 1 wherein the switch is a normally open relay.

7. The communications line security device of claim 1 further comprising a plurality of LEDs to indicate the status of the communications line security device.

8. The communications line security device of claim 1 further comprising a line activity detector electrically connected to the communications path and the controller, the line activity detector signalling the controller when the caller has disconnected from the piece of terminal equipment such that the controller can reopen the switch.

9. The communications line security device of claim 1 wherein the communications line is an electrical connection between computers.

10. A communications line security device for securing the connection between a caller and a piece of terminal equipment, the communications line security device comprising:
    a) a controller;
    b) a first caller source information receiver electrically connected between the controller and an authentication line;
    c) a DTMF receiver electrically connected between the controller and the authentication line which decodes DTMF data on the authentication line for the controller;
    d) a second caller source identification receiver electrically connected between the controller and a communications line; and
    e) a relay electrically connected between the caller and the piece of terminal equipment in the communications line which provides, when open, a physical disconnection between the caller and the piece of terminal equipment, the relay electrically connected to and controlled by the controller.

11. The communications line security device of claim 10 further comprising an audio playback unit electrically connected to the controller and authentication line which provides audio messages to the caller.

12. The communications line security device of claim 10 wherein the relay is a normally open relay.

13. The communications line security device of claim 12 further comprising a manually activated switch which bypasses the normally open relay.

14. The communications line security device of claim 10 further comprising an authentication code switch bank which physically stores a current valid authentication code.

15. The communications line security device of claim 10 further comprising a plurality of LEDs to indicate the status of the communications line security device.

16. The communications line security device of claim 10 further comprising a line activity detector electrically connected to the communications line and the controller, the line activity detector signalling the controller when the caller has disconnected from the piece of terminal equipment such that the controller can reopen the relay.

17. The communications line security device of claim 10 further comprising a table of callers banned from accessing the piece of terminal equipment.

18. The communications line security device of claim 10 wherein the communications line is a telephone line.

19. The communications line security device of claim 10 wherein the communications line is an electrical connection between computers.

20. The communications line security device of claim 14 further comprising a code comparator to compare the DTMF data on the authentication line to the valid authentication code stored in the authentication code switch bank.

21. A method for securing a piece of terminal equipment on a communications line from unauthorized access using a device including a controller, an authentication line, a communications path and a relay providing a physical disconnection in the communications path, the method comprising the steps of:

a) receiving a call from a source on the authentication line;

b) checking information regarding the source of the call on the authentication line;

c) answering the authentication line and receiving an authentication code from the caller;

d) validating the authentication code using the controller;

e) receiving a call from the source on the communications line;

f) checking information regarding the source of the call on the communications line to ensure that the information matches that received on the authentication line; and g) closing the relay to complete the communications path using the controller.

22. The method of claim 21 further comprising the steps of:

h) monitoring activity on the communications line; and i) signalling the controller when activity on the communications line is ended.

23. The method of claim 21 further comprising the step of:

h) reopening the relay when the call is completed.

24. The method of claim 21 further comprising between steps (d) and (e), the step of adding the information concerning the source of the call to a table of banned callers if the authentication code entered is invalid.

25. The method of claim 21 wherein the controller includes an authentication code switch bank for physically storing a current valid authentication code and a code comparator for comparing the authentication code from the caller to the valid authentication code stored in the authentication code switch bank.

* * * * *